Patented May 19, 1936

2,041,264

UNITED STATES PATENT OFFICE 2,041,264

EMULSION

Walter Collins O'Kane, Durham, N. H.

No Drawing. Application December 7, 1931, Serial No. 579,663

2 Claims. (Cl. 167—30)

This invention relates to emulsions and methods of preparing the same.

Among the objects of the present invention are the production of emulsions of a cream-like consistency, having specially desirable properties for particular utilities, depending on the ingredients employed in producing the emulsions.

Other and further objects and advantages will appear from the more detailed description given below, it being understood however that this more detailed description is given by way of illustration and explanation only, and not by way of limitation, since various changes may be made in that more detailed description by those skilled in the art, without departing from the scope and spirit of the present invention.

In accordance with this invention, it has been found that the dialkyl phthalates, such as diethyl phthalate, dibutyl phthalate, diamyl phthalate, may be emulsified, particularly in aqueous solutions, and preferably in the presence of emulsifying agents, to produce products of a cream-like consistency. These dialkyl phthalates are oily liquids of relatively high boiling points, and have been found by this process to yield substantially smooth emollient cream-like products of valuable utility. Among such uses for these products, for example, these cream-like emulsions may be applied to the human skin without deleterious effects, for use as insect repellents, or insectifuges. In consistency and general properties they may be likened to the cold creams and vanishing creams, depending on the character and proportions of the ingredients employed in their production. But they are distinguished from the cold creams and vanishing creams by the fact that the dialkyl phthalate is the base of the emulsion in the present products, whereas no analogous material is utilized in the production of the cold creams and vanishing creams on the market.

When such cream-like products as those produced by the present invention are employed as insect repellents or as insectifuges, they avoid the prior art types of materials which utilized insect repellents dissolved in greasy or oily vehicles. Such prior art materials leave the skin in a greasy or oily condition, whereas the cream-like materials of the present invention do not have that disadvantage. Furthermore the products of the present invention may be readily and evenly distributed over the skin. They are free from the rapid evaporation properties of the prior art types of repellent materials, as when the repellent was dissolved in alcohol and so on.

As emulsifying agents, sodium stearate, sodium oleate, and other soaps, such as potassium soaps, may be employed, or mixtures of such emulsifying agents may be utilized. For example, diethyl phthalate may be emulsified in an aqueous medium with sodium oleate, and a small amount of sodium stearate, to produce a product in consistency and in characteristics similar to a cold cream. Varying amounts of diethyl phthalate may be present in such emulsions, and it has been found that from 25 to 50% or more of the diethyl phthalate may be readily emulsified this way into the cream-like material. Such a product is conveniently and readily applied to the human skin, and particularly when high concentrations of the diethyl phthalate are present, but a small amount of material need be applied to the skin in order to have a relatively high effective concentration of the repellent material. If desired, perfuming ingredients may be included in the composition, although these are not essential because the odors of the dialkyl phthalates are not undesirable.

Other liquid oily type materials may be emulsified in accordance with the present invention, particularly when those oily liquids, such as oil of citronella also have insect repellent properties. And in one phase of the present invention, there is included the production of cream-like emulsions of oily materials possessing such insect repellent properties.

The cream-like emulsions of the present invention in which the oil-like material, such as diethyl phthalate, is emulsified to form the base of the cream-like preparations, are to be distinguished from and are superior to the production of the ordinary cold cream or vanishing cream type material to which an insect repellent is added. While the latter materials may be employed, they are not as desirable as the cream-like emulsions of the present invention produced by the use of diethyl phthalate or similar material as the base of the cream-like preparation.

As a specific example for the preparation of a cream-like emulsion from diethyl phthalate, the following is noted:

| | Percent |
|---|---|
| Diethyl phthalate | 50 |
| Sodium oleate | .5 |
| Sodium stearate | 4 |
| Water | 45.5 |

The proportions of sodium oleate and sodium stearate and proportions of diethyl phthalate may be altered in considerable degree. Other similar formulae may be made up employing only half as much diethyl phthalate, and a correspondingly larger amount of water. The proportions of sodium stearate and sodium oleate may be varied, for example so that the sodium oleate is the larger proportion of the emulsifying agent. The different results achieved by these variations in proportions and ingredients reside chiefly in the manner of concentration of the repellent substance, such as the diethyl phthalate, and in the firmer or softer consistency of the resulting cream. In all cases, the advantages persist, namely a cream that has as its base the actual repellent substance, this cream being substantially invisible when applied to the skin, and having no oily or waxy character.

As exemplary of emulsions made with the use of aromatic oils, such as oil of citronella, the following are given. For example, for this purpose an emulsion may be made in which the oil of citronella is emulsified with potash cocoanut oil soap, the final product also containing a small percentage of talc, which improves its physical properties.

The following are typical formulae for this purpose:

|  | Per cent |
|---|---|
| Potash fish oil soap (60% dry weight soap) | 60 |
| Oil of citronella | 30 |
| Talc | 10 | or

|  | Per cent |
|---|---|
| Potash fish oil soap (60% dry weight) | 50 |
| Oil of citronella | 25 |
| Talc | 25 |

The emulsions produced with the materials set forth above are white in color, and when rubbed on the skin they leave no sign of oil or grease; in fact, there is no trace of any material whatever, except the marked odor of citronella repellent. In this way they distinguish markedly and advantageously from the ordinary repellents which consist in adding the oil of citronella to olive oil or vaseline, or similar vehicle.

The method of using the aromatic oils may be applied to other aromatic oils than oil of citronella, such as oil of pennyroyal, oil of lavender, and so on.

Having thus set forth my invention, I claim:

1. As an insectifuge, an emulsion of a dialkylphthalate in water carrying a small amount of soap as emulsifying agent, in proportions to give the emulsion a cream like consistency comparable in consistency with cold creams and vanishing creams but distinguished therefrom by the fact that the dialkylphthalate is the base of the emulsion.

2. As an insectifuge, an emulsion of diethylphthalate in water carrying a small amount of soap as an emulsifying agent, the proportions of ingredients being 50% of diethylphthalate, 4.5% soap, and 45.5% water, the emulsion having a cream like consistency comparable in consistency with cold creams and vanishing creams but distinguished therefrom by the fact that the diethylphthalate is the base of the emulsion.

WALTER COLLINS O'KANE.